Figure 2:
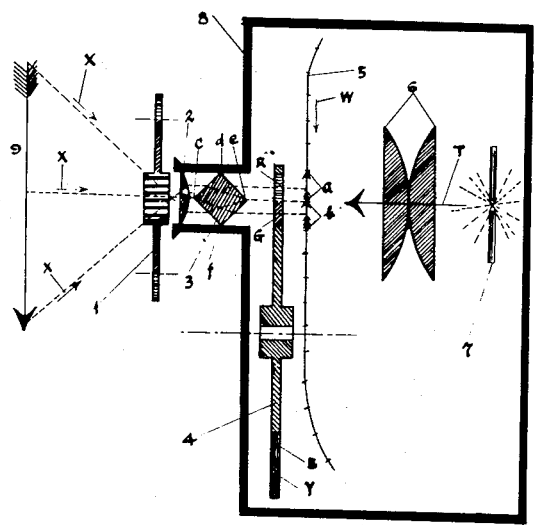

May 13, 1924.

K. KAMEI 1,493,549

DEVICE FOR TAKING AND PROJECTING COLOR CINEMATOGRAPHY

Filed Feb. 4, 1919

Witnesses:
Sugao Saga
Kinzo Sakai

Inventor
Katsujiro, Kamei.

Patented May 13, 1924.

1,493,549

UNITED STATES PATENT OFFICE.

KATSUJIRO KAMEI, OF NISHINOMIYA-MACHI, MUKOGUN, JAPAN.

DEVICE FOR TAKING AND PROJECTING COLOR CINEMATOGRAPHY.

Application filed February 4, 1919. Serial No. 274,930.

*To all whom it may concern:*

Be it known that KATSUJIRO KAMEI, subject of the Emperor of Japan, residing at No. 788 Ichigo-chi, Nishinomiya-machi, Mukogun, Hyogo Province, Japan, has invented certain new and useful Improvements in Devices for Taking and Projecting Color Cinematography, of which the following is a specification.

This invention relates to devices for taking and projecting color-cinematography and consists of a device in which a colourless transparent cubical prism is fitted inside of a camera in the path of light passing through the lens so that four sides of the cubical prism make an angle of 135 degrees with respect to the optical axis of the lens; and a disc having four color-filters of red, orange-yellow, bluish-green, and indigo-purple is revolved in a proper manner in the path of the light entering the camera through the cubical prism.

The object of the invention is to provide an apparatus which will take and project a perfect color-kinematograph that will not irritate the spectators' eyes. For this purpose, four series of colors of red and bluish-green, bluish-green and orange-yellow, orange-yellow and indigo-purple, and indigo-purple and red, combined from four coloured transparent plates coloured respectively red, orange-yellow, bluish-green, and indigo-purple, are used; and double images of two colors of each series referring to the object, are projected or taken through the cubical prism arranged behind the lens.

The accompanying drawing shows a device for taking and projecting the color-cinematography of this invention.

Referring to the drawing:—

Figure 1:
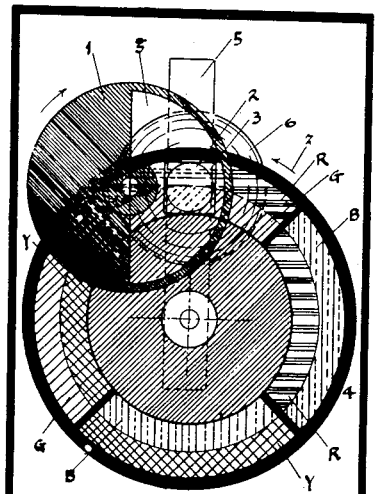
Figure 4:
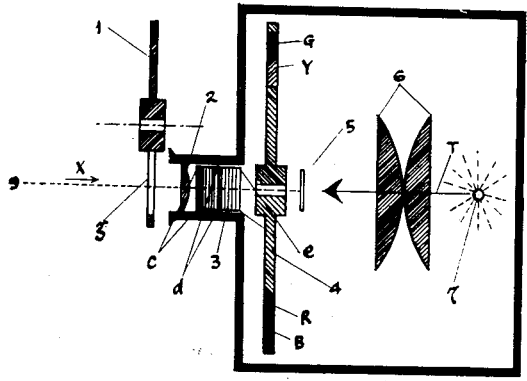
Figure 3:
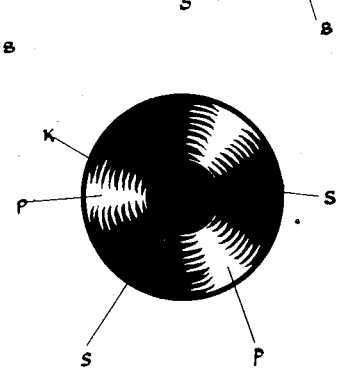

Fig. 1 is a front elevation of the apparatus. Fig. 2 is a vertical sectional view of the same. Fig. 3 shows a modified form of shutter. Fig. 4 is a horizontal sectional view of the apparatus.

In the drawing (1) is a shutter; (2) a photo-lens, (3) a cubical prism; (4) a circular disc holding four coloured transparent plates of red, orange-yellow, bluish-green, and indigo-purple, (5) a film for cinematography; (6) a condenser lens; (7) a source of light; (8) a camera, (9) an object, (R) a red coloured transparent plate, (C) a bluish-green coloured transparent plate, (Y) an orange-yellow coloured transparent plate; (B) indigo-purple coloured transparent plate; (S) a shutter having saw tooth shaped clearance (P). For applying this invention for practical purposes, it is desirable to explain the methods of taking and projecting photographs. In taking photographs, the light rays advancing in the direction of arrows X as shown in dotted line, pass through the clearance (g) of the shutter (1) and lens (2), and are refracted at a surface (c) (f) of the square prism (3); the rays then pass through the surface (d) (e) and are focused at (a) on the film (5). Other rays of light which are refracted at a surface (c) (d) pass through the surface (e) (f), are focused identically at (b) on the film (5) in the same plane with (a). So, the object (9) makes double images in the same shape at (a) and (b) on the film (5).

This machine may be driven in the proper manner so that the disc (4) makes one revolution per four revolutions of the shutter (1). The film (5) advances kinematographically at each revolution of the shutter (1) in the direction of (W), and in every exposure a particular shade is given on one section of the film (5) through a part due to one color of the original color filter. Thus a continuous moving scene of an object may be photographed on the panchromatic film. As the light acts on (a) and (b) on the film (5) in each exposure, four series of colour values will be made on the film by the red coloured transparent plate (R) and bluish-green coloured transparent plate (G), bluish-green coloured transparent plate (G) and orange-yellow coloured transparent plate (Y), orange-yellow coloured transparent plate (Y) and indigo-purple coloured transparent plate (B), and indigo-purple coloured transparent plate (B) and red coloured transparent plate (R), in the course of the revolution of the disc (4). Thus the film (5) is continuously exposed twice through the same kind of coloured filter.

In projecting photographs, the positive film is made from the negative film photographed by the above mentioned method, and this positive film is arranged in the camera in the same location as that occupied by the negative film during photographing. When the brilliant white light is projected in the direction of (T) from source of light, it passes through the condenser lens (6) and the film (5) in the reverse direction to that of the path of light during photographing as represented by the dotted line. Then, penetrating a part of the transparent plate of the disc (4), it refracts on a surface (d) (e), exits from the surface (c) (f), and so on through the lens (2). Again, in a part of (b) of the film (5) the light passes, in the opposite direction to the former, through a part of transparent plate of the disc (4). Then, it refracts on the surface (e) (f) of the prism (3), exits from the surface (d) (c), and so on through the lens (2). In case of projecting, the positive colors due to (a) (b) on the film are combined and projected on the white curtain (because the direction of light is opposite). The disc (4) revolves as in the former case. A distinct part of positive film printed from the negative film, photographed through red part (R), is projected on the white curtain through the red transparent plate.

Thus during operation, the color cinematography is projected in rich colors similar to that of the object. If the saw tooth shaped shutters shown in Fig. 3 are used instead of the shutter shown in Fig. 1 the teeth (K) on the side edges of the segments (P) will permit the pictures to be projected without flickering.

We may note the speciality of this invention next. In both cases of taking and projecting, the cubical prism (3) is fixed behind the lens (2).

In the former case, double images are focused at (a) (b) on the film; and the latter case, the double images (a) (b) are combined through the cubical prism (3) and the lens (2), while four original colors of the transparent plate (R) (R) (Y) (B) on the disc (4) are brought into four states combining every two. Particularly, if the shutter (S) having saw tooth clearance (P) be used in projecting, the projection obtains rich color without flickering.

In this invention, the combination of a plurality of pictures is not troublesome to the eye nor imperfect as in other devices employing two lens and two color filters of red and bluish-green. With my device, one color (say, red) is combined with two different colors (say, bluish-green and indigo-purple).

What I claim and desire to secure by Letters Patent is:—

1. An apparatus for taking and projecting color cinematography comprising a camera casing, a lens for said casing, a disk having a series of pairs of differently colored segments located in the path through which light passes from the lens to a film, and means for simultaneously producing a plurality of identical images through said disk and on to the film.

2. An apparatus as defined in claim 1, in which the said means consists of a cubical prism located between the lens and disk.

3. An apparatus as defined in claim 1 in which the pairs of segments are respectively red, bluish-green, orange-yellow and purple-indigo.

4. A device for taking and projecting color cinematography comprising a camera provided with a disc having two segments each of red, bluish-green, orange-yellow and purple-indigo colored transparent plates, the disk being located in front of the film in the path of light entering through a lens, and a cubical prism located between the lens and disk.

In testimony whereof he affixes his signature in the presence of two witnesses.

KATSUJIRO KAMEI.

Witnesses:
T. KOMENCH,
S. SOGA.